(12) United States Patent
Nowak et al.

(10) Patent No.: US 10,767,553 B2
(45) Date of Patent: Sep. 8, 2020

(54) TURBOCHARGER WITH A TURBINE HOUSING TO WHICH IS ATTACHED AN ACTUATOR HOUSING OF A WASTE GATE VALVE

(71) Applicant: PIERBURG GMBH, Neuss (DE)

(72) Inventors: Martin Nowak, Leverkusen (DE); Michael-Thomas Benra, Castrop-Rauxel (DE); Axel Hemsing, Duesseldorf (DE); Andreas Koester, Essen (DE)

(73) Assignee: PIERBURG GMBH, Neuss (DE)

( * ) Notice: Subject to any disclaimer, the term of this patent is extended or adjusted under 35 U.S.C. 154(b) by 740 days.

(21) Appl. No.: 15/309,206

(22) PCT Filed: Feb. 19, 2015

(86) PCT No.: PCT/EP2015/053476
§ 371 (c)(1),
(2) Date: Nov. 7, 2016

(87) PCT Pub. No.: WO2015/169459
PCT Pub. Date: Nov. 12, 2015

(65) Prior Publication Data
US 2017/0082017 A1 Mar. 23, 2017

(30) Foreign Application Priority Data
May 9, 2014 (DE) .......................... 10 2014 106 517

(51) Int. Cl.
*F02B 37/18* (2006.01)
*F01D 5/04* (2006.01)
(Continued)

(52) U.S. Cl.
CPC .............. *F02B 37/186* (2013.01); *F01D 5/04* (2013.01); *F01D 17/105* (2013.01); *F01D 25/24* (2013.01);
(Continued)

(58) Field of Classification Search
CPC .......... F01D 17/105; F01D 25/24; F01D 5/04; F02B 33/40; F02B 37/186; F02B 39/005; F05D 2220/40; Y02T 10/144
(Continued)

(56) References Cited

U.S. PATENT DOCUMENTS 9,976,475 B2 * 5/2018 Nowak ................. F02B 37/186
10,385,764 B2 * 8/2019 Nowak .................. F02B 33/40
(Continued)

FOREIGN PATENT DOCUMENTS

DE 10 2008 004 688 A1 7/2009
DE 10 2008 014 609 A1 9/2009
(Continued)

OTHER PUBLICATIONS

English Machine Translation of DE102008014609A1, published on Sep. 24, 2009, translated on Aug. 1, 2019.*
(Continued)

*Primary Examiner* — Patrick Hamo
*Assistant Examiner* — Paul W Thiede
(74) *Attorney, Agent, or Firm* — Norman B. Thot

(57) ABSTRACT

A turbocharger includes a waste gate valve, a compressor, a turbine, a turbine housing which houses the turbine, a bypass channel which includes an opening cross-section, the bypass channel bypassing the turbine, a bypass channel portion formed in the turbine housing, an actuator housing which includes a separate first coolant channel having a coolant inlet port and a coolant outlet port, an electric motor arranged in the actuator housing, a transmission which
(Continued)

includes an output shaft, the transmission being arranged in the actuator housing, and a control body coupled to the output shaft. The actuator housing is formed separately and is secured to the turbine housing. The control body controls the opening cross-section of the bypass channel.

14 Claims, 4 Drawing Sheets

(51) Int. Cl.
    *F01D 17/10*     (2006.01)
    *F01D 25/24*     (2006.01)
    *F02B 33/40*     (2006.01)
    *F02B 39/00*     (2006.01)

(52) U.S. Cl.
    CPC ............ *F02B 33/40* (2013.01); *F02B 39/005* (2013.01); *F05D 2220/40* (2013.01); *Y02T 10/144* (2013.01)

(58) Field of Classification Search
    USPC .................................. 415/182.1; 60/602, 599
    See application file for complete search history.

(56) References Cited

U.S. PATENT DOCUMENTS

| | | | |
|---|---|---|---|
| 2003/0185672 | A1 | 10/2003 | Suganami et al. |
| 2007/0199318 | A1 | 8/2007 | Wood |
| 2008/0298953 | A1 | 12/2008 | Harris |
| 2009/0020105 | A1 | 1/2009 | Koster et al. |
| 2010/0024414 | A1 | 2/2010 | Hittle et al. |
| 2010/0043429 | A1 | 2/2010 | Wolk et al. |
| 2010/0129205 | A1 | 5/2010 | Schwerdel |
| 2012/0060494 | A1 | 3/2012 | Sato et al. |
| 2012/0171059 | A1 | 7/2012 | Love et al. |
| 2012/0267969 | A1 | 10/2012 | Iwamoto et al. |
| 2012/0285411 | A1 | 11/2012 | Nowak et al. |
| 2013/0011243 | A1 | 1/2013 | Alajbegovic |
| 2013/0049502 | A1 | 2/2013 | Gotoh |
| 2013/0291539 | A1 | 11/2013 | Koch et al. |
| 2013/0327036 | A1 | 12/2013 | Bogner et al. |
| 2013/0340426 | A1 | 12/2013 | Bogner et al. |
| 2014/0047832 | A1 | 2/2014 | Matthews |
| 2017/0074158 | A1* | 3/2017 | Nowak .................. F02B 37/186 |
| 2017/0082016 | A1* | 3/2017 | Nowak .................. F02B 37/186 |
| 2017/0082017 | A1 | 3/2017 | Nowak et al. |
| 2017/0248070 | A1 | 8/2017 | Heddy, III et al. |

FOREIGN PATENT DOCUMENTS

| | | |
|---|---|---|
| DE | 10 2009 056 251 A1 | 6/2011 |
| DE | 10 2010 025 207 A1 | 12/2011 |
| DE | 10 2011 002 627 A1 | 7/2012 |
| DE | 11 2011 100 249 T5 | 11/2012 |
| DE | 10 2011 056 838 A1 | 6/2013 |
| DE | 11 2010 005 814 T5 | 6/2013 |
| JP | 2009-191707 A | 8/2009 |
| JP | 2012-241619 A | 12/2012 |
| WO | WO 2008/115773 A2 | 9/2008 |
| WO | WO 2009/090131 A1 | 7/2009 |
| WO | WO 2010/009945 A2 | 1/2010 |
| WO | WO 2010/123899 A1 | 10/2010 |
| WO | WO 2012/089459 A1 | 7/2012 |

OTHER PUBLICATIONS

J. Hintze et al.: "Maschinenelemente, Baugruppen und ihre Montage", Lehrbuch Für Die Berufsbildung, English Translation, relevant part marked on p. 109, pp. 108-112 (1982).

\* cited by examiner

TURBOCHARGER WITH A TURBINE HOUSING TO WHICH IS ATTACHED AN ACTUATOR HOUSING OF A WASTE GATE VALVE

CROSS REFERENCE TO PRIOR APPLICATIONS

This application is a U.S. National Phase application under 35 U.S.C. § 371 of International Application No. PCT/EP2015/053476, filed on Feb. 19, 2015 and which claims benefit to German Patent Application No. 10 2014 106 517.4, filed on May 9, 2014. The International Application was published in German on Nov. 12, 2015 as WO 2015/169459 A1 under PCT Article 21(2).

FIELD

The present invention relates to turbochargers with a waste gate valve, a compressor, a turbine, a turbine housing, a bypass channel for bypassing the turbine, a bypass channel portion which is formed in the turbine housing, an actuator housing, an electric motor which is arranged in the actuator housing, a transmission which is arranged in the actuator housing, an output shaft of the transmission, and a regulating element which is coupled to the output shaft and controls an opening cross-section of the bypass channel.

BACKGROUND

Turbochargers with waste gate valves have previously been described. A turbocharger serves to increase the boost pressure and thus to increase the power of the internal combustion engine. The pressure that can be generated is always a function of the exhaust gas quantity conveyed due to the turbine wheel being coupled with the compressor wheel. It is therefore necessary to reduce or control the drive power acting on the compressor under certain operating conditions.

Waste gate valves, are therefore used, among others, which valves are arranged in a bypass channel via which the turbine can be bypassed so that the turbine wheel is no longer acted upon by the entire flow quantity of the exhaust gas. These waste gate valves are most often designed as flap valves which are operated via a pneumatic actuator which drives a linkage coupled with the flap.

Since a high thermal load exists in the region of the turbine housing due to hot exhaust gases, these pneumatic actuators have been arranged in the region of the compressor, and in particular at a distance from the turbine housing, in order to reduce thermal load.

An exact control of the exhaust gas quantity discharged via the bypass channel is, however, difficult to achieve with a pneumatic actuator. Electric motors have therefore seen widespread use as drives for waste gate valves in recent years. These were typically also arranged at a distance from the turbine housing to reduce thermal load so that linkages were still used for coupling with the flap.

Because of ever decreasing available installation space, it is desirable to arrange the actuators of the waste gate valves in the immediate proximity to the valve itself since the installation space necessary is thus reduced and a more precise control becomes possible. When linkages are used, an increased wear of the mechanical components and increased assembly efforts also often occur.

WO 2012/089459 A1 therefore describes a turbocharger with a water-cooled turbine housing and an integrated electric waste gate valve. The housing in which the electric motor for driving the waste gate valve and the transmission are arranged is a part of the turbine housing in which corresponding cooling channels are formed to carry water. The electric motor and the transmission are thus mounted on the turbine housing, wherein the necessary opening in the turbine housing is closed with a cover. The bearing of the valve is also arranged in the turbine housing.

The use of the above waste gate valve arrangement still risks a thermal overload of the actuator since the cooling medium is strongly heated while flowing through the turbine housing. The actuator is also subjected to a direct thermal radiation from outside so that, under unfavorable conditions, a risk of overheating still exists.

SUMMARY

An aspect of the present invention is to provide a turbocharger having a waste gate valve which reliably avoids a thermal overload of the actuator drive. Another aspect of the present invention is that the waste gate valve is easy to assemble, requires an installation space which is as small as possible, and has the greatest possible controllability exactness.

In an embodiment, the present invention provides a turbocharger which includes a waste gate valve, a compressor, a turbine, a turbine housing configured to house the turbine, a bypass channel comprising an opening cross-section, the bypass channel being configured to bypass the turbine, a bypass channel portion formed in the turbine housing, an actuator housing comprising a separate first coolant channel which comprises a coolant inlet port and a coolant outlet port, an electric motor arranged in the actuator housing, a transmission comprising an output shaft, the transmission being arranged in the actuator housing, and a control body coupled to the output shaft. The actuator housing is formed separately and is secured to the turbine housing. The control body is configured to control the opening cross-section of the bypass channel.

BRIEF DESCRIPTION OF THE DRAWINGS

The present invention is described in greater detail below on the basis of embodiments and of the drawings in which.

DETAILED DESCRIPTION

Figure 1:
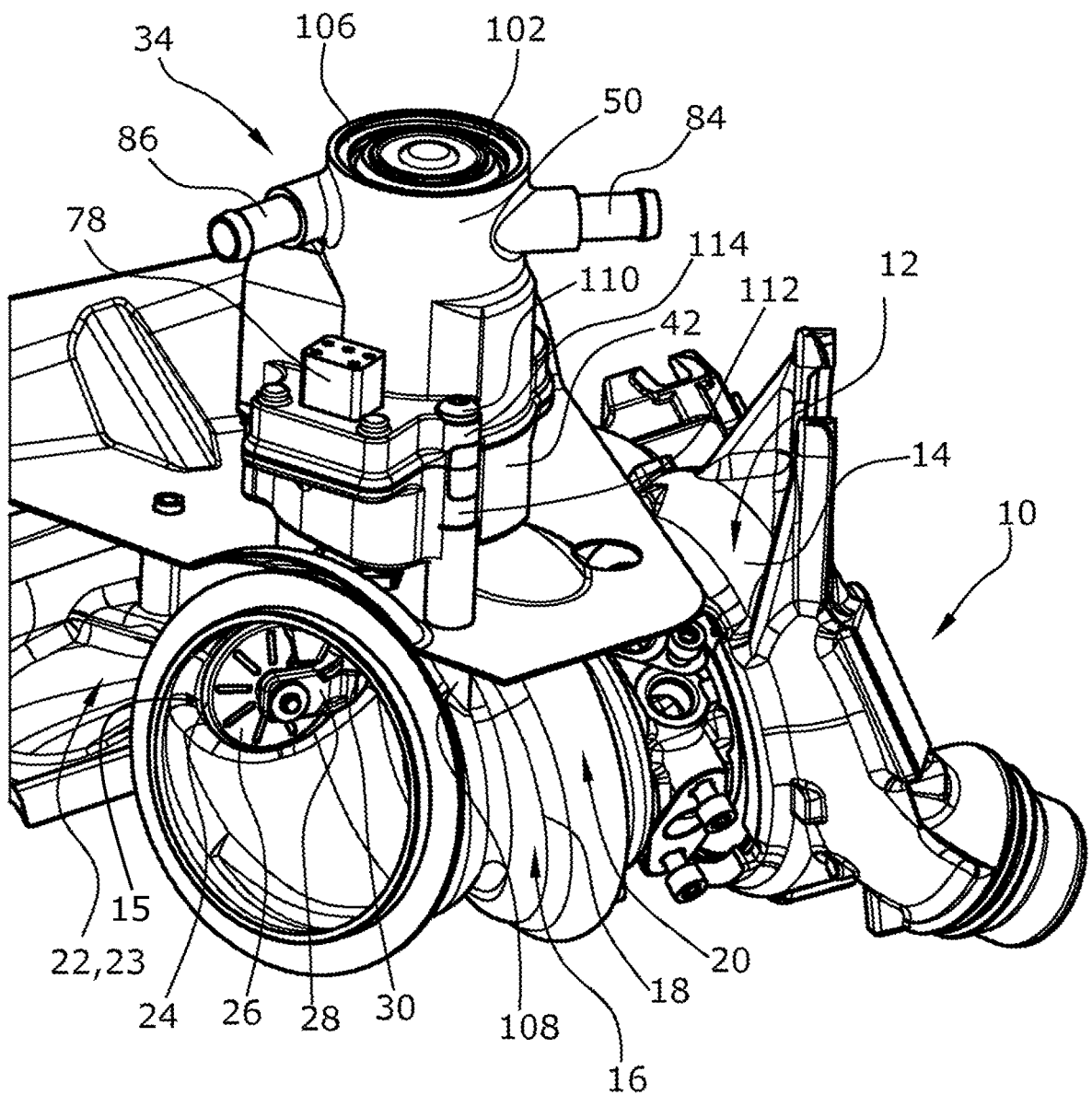
FIG. 1 is a side view of a turbocharger of the present invention with a waste gate valve in a perspective view.
Figure 2:
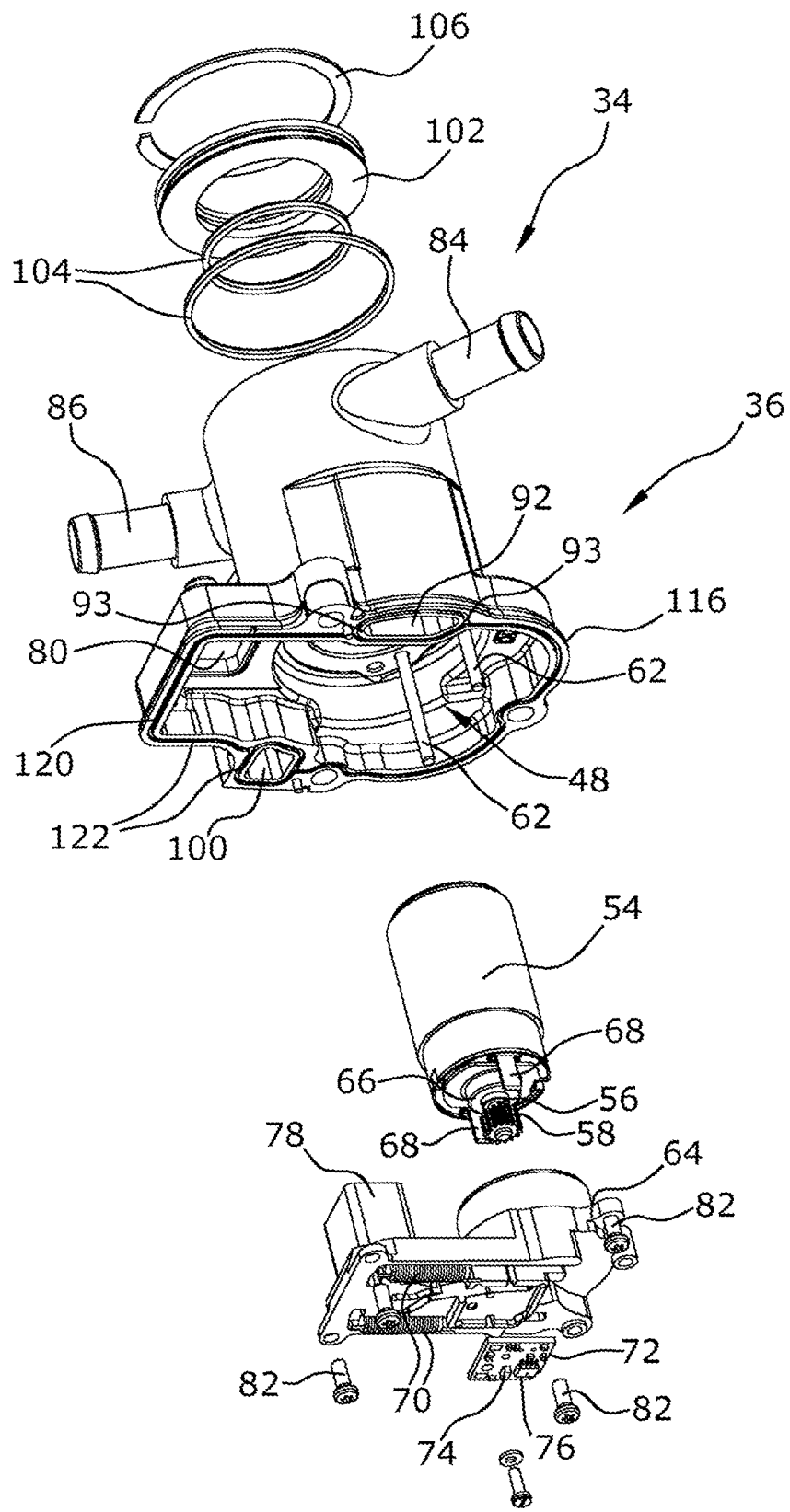
FIG. 2 is an exploded perspective side view of a drive housing of the waste gate valve in FIG. 1.

Due to the fact that the actuator housing is formed separately and is mounted on the turbine housing, with the actuator housing having a separate coolant channel with a coolant inlet port and a coolant outlet port, a separate coolant supply to the actuator is provided so that the coolant supply can be effected depending on the temperature actually prevailing in the actuator housing and independent of the temperature in the turbine housing. The effect of the heat radiation from the turbine is significantly reduced since the actuator housing is cooled directly. A thermal separation from the turbine housing is achieved via which a very precise control of the waste gate valve becomes possible.

In an embodiment of the present invention, the coolant channel can, for example, surround the electric motor substantially radially. This means that the heat in the area of the electric motor can be dissipated directly. It is further largely excluded that heat radiation heats the electric motor up from outside via the actuator housing. Thermal overload can thereby be reliably excluded.

In an embodiment of the present invention, the coolant channel can, for example, be interrupted in the circumferential direction by a partition wall arranged between the coolant inlet port and the coolant outlet port. A short circuit flow from the inlet port to the outlet port is thereby reliably prevented and a cooling over the entire circumference is thus provided.

In an embodiment of the present invention, the coolant channel can, for example, be interrupted in the circumferential direction by two partition walls that extend radially and, seen in the circumferential direction, are arranged on either side of the coolant outlet port so that a substantially axial throughflow direction is defined starting from the inlet port. This results in a good distribution of the coolant.

In an embodiment of the present invention, screw domes can, for example, be provided at the actuator housing via which the actuator housing is fastened to the turbine housing via screws. The distance to the hot turbine housing can be increased using the screw domes so that the heat transfer to the electric motor is reduced.

In an embodiment of the present invention, the actuator can, for example, have a two-part design. An additional thermal separation of the electric motor and the turbine housing is thereby achieved and the housing part receiving the electric motor can be thermally decoupled from the turbine housing.

In an embodiment of the present invention, the actuator housing can, for example, have a drive housing and a bearing housing which are connected with each other, with the electric motor being arranged in the drive housing, and the output shaft being supported in the bearing housing. The heat conducted via the output shaft thus does not reach the electric motor directly, but may already be dissipated in the bearing housing.

The transmission and an electronics unit are also arranged in a space delimited by the drive housing and the bearing housing. This space is thus situated between the two housing parts and thus also between the turbine housing and the heat-sensitive electric motor. Mounting the transmission and the electronics unit is particularly simple due to the good accessibility.

In an embodiment of the present invention, the coolant inlet port, the coolant outlet port, and the first coolant channel, as well as a coolant inlet channel and a coolant outlet channel are formed at the drive housing, and a coolant inlet channel, a second coolant channel and a coolant outlet port are formed at the bearing housing, wherein the coolant outlet channel of the drive housing opens into the coolant inlet channel of the bearing housing and the coolant outlet channel of the bearing housing opens into the coolant inlet channel of the drive housing. The coolant consequently first flows in sections around the electric motor and then flows through the bearing housing. The coolant then returns to the drive housing where it cools a second section of the electric motor before it flows out again from the coolant outlet port. A large portion of the heat from the exhaust gas can thus already be dissipated in the area of the bearing housing before it can get into the drive housing.

In an embodiment of the present invention, a bearing for supporting the output shaft can, for example, be fully surrounded by the second coolant channel in the radial direction. Both housing parts are thereby protected against heat radiation by the flow flowing around them in the circumferential direction. A high cooling effect is further provided by the large heat absorbing surface between the housing parts and the coolant channels.

To provide this flow all around the drive housing and additionally also a flow of coolant into the bearing housing, the partition walls that interrupt the first coolant channel in the circumferential direction extend over the entire height of the first coolant channel, wherein the partition walls are formed as an extension of the walls delimiting the coolant channel of the drive housing in the circumferential direction.

In an embodiment of the present invention, the electronics unit can, for example, have a connector and a position sensor so that a precise position feedback corresponding to the position of the output shaft becomes possible. Electric components and lines may be placed entirely in the electronics unit so that additional electric assemblies are not required.

In an embodiment of the present invention, the control body can, for example, be mounted on the output shaft. This mounting may either be a direct mounting on the shaft or be achieved via a lever extending from the shaft and engaging the control body. Such a design reduces the assembly effort and allows for a very exact controllability.

In an embodiment of the present invention, the control body can, for example, be coupled with a flap shaft having a common axis of rotation with the output shaft. Good controllability is thereby maintained, while a thermal separation or isolation can be used to reduce the heat transported into the actuator via the shaft.

This may be effected, for example, by coupling the flap shaft with the output shaft via an Oldham coupling that provides a direct rotational coupling and at the same time provides a tolerance compensation and reduces heat transport due to the reduced contact surfaces. This coupling can also be made from a material with low thermal conductivity, such as ceramics.

A turbocharger with a waste gate valve is accordingly provided that is reliably protected from thermal overload, which may be mounted to the turbocharger as a preassembled component so that assembly is facilitated, and which makes a very precise control of the waste gate valve possible. The cooling can be adapted separately to the requirements of the turbine and the valve. The necessary installation space is significantly reduced compared to known designs.

An embodiment of a turbocharger of the present invention with a waste gate valve is illustrated in the drawings and will be described hereunder.

The turbocharger 10 illustrated in FIG. 1 comprises a compressor 12 with a compressor wheel arranged in a compressor housing 14, and a turbine 16 with a turbine wheel arranged in a turbine housing 18. The turbine wheel is fastened in a manner known per se on a common shaft with the compressor wheel so that the movement of the turbine wheel caused by an exhaust gas flow in the turbine housing 18 is transmitted to the compressor wheel via the shaft, whereby an airflow is compressed in the compressor housing 14.

A bypass channel 22 in which a waste gate valve 15 is arranged branches off upstream of the spiral channel 20 surrounding the turbine wheel in the turbine housing 18. This bypass channel 22 opens into the subsequent exhaust gas channel of the internal combustion engine behind the spiral channel 20.

A valve seat 24 that surrounds an opening cross section of the bypass channel 22 is situated in a bypass channel section 23 formed in the turbine housing 18. The opening cross section is controllable by a control body 26 of the waste gate valve 15 in the form of a flap, which may be placed on the valve seat 24 to close the opening cross section and which may be lifted off the valve seat 24 to open the flow cross section of the bypass channel 22.

The control body 26 is fastened to a lever 28 for this purpose that extends from a flap shaft 30 and is integrally formed therewith. The flap shaft 30 has the same axis of rotation as the drive shaft/output shaft 32 of an actuator 34 via which the control body 26 is operated. The output shaft 32 extends out of an actuator housing 36 towards the turbine housing 18 and is connected for rotation with the flap shaft 30 by an Oldham coupling 38, whereby other couplings between the output shaft 32 and the flap shaft 30 are also conceivable.

Figure 3:
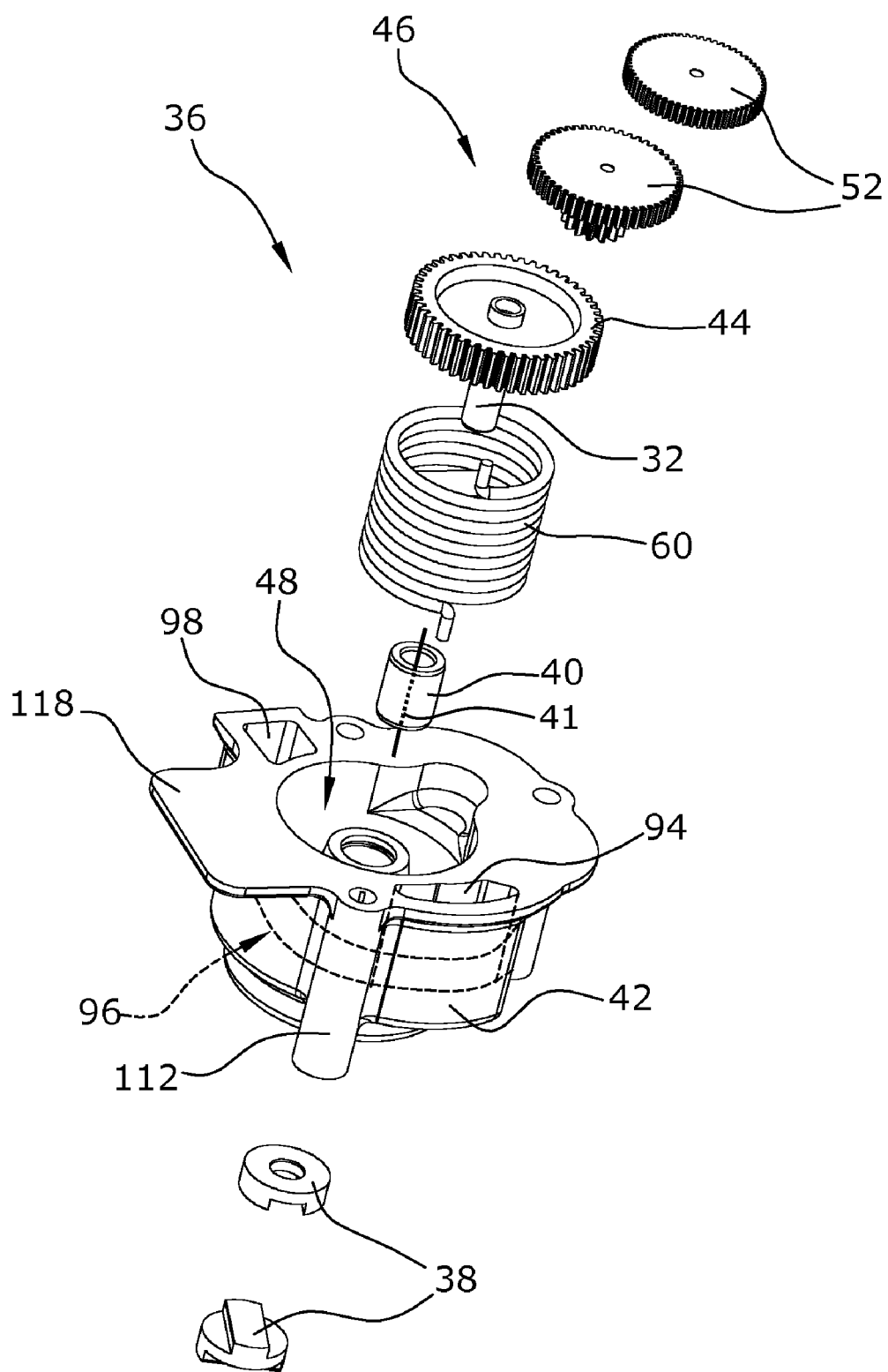
FIG. 3 is an exploded sectional side view of a bearing housing of the waste gate valve in FIG. 1.

As can in particular be seen in FIG. 3, the output shaft 32 is supported by a bearing 40 in a bearing housing 42 which forms a first housing part of the actuator housing 36. An output gear 44 of a transmission 46 designed as a spur gear transmission is arranged on the output shaft 32, which is arranged in a space 48 that is delimited on the one hand by the bearing housing 42 and on the other hand by a second housing part of the actuator housing 36 serving as a drive housing 50.

Further gears 52 of the transmission 46 are driven by an electric motor 54 which has a drive pinion 58 arranged on its input shaft 56, the drive pinion 58 meshing with the subsequent transmission stage of the transmission 46.

A return spring 60 is additionally arranged in the bearing housing 42 by which, in the event of a failure of the electric motor 54 or of another malfunction, the output shaft 32, and thus the control body 26, is rotated into a fail-safe position so as to avoid damage to the turbocharger 10.

An electronics unit 64 is arranged in the space 48 besides the gears 44, 52, 58 of the transmission 46, of which two gears 52 are arranged on axles 62 that protrude into the space 48 from the drive housing 50. The electronics unit 64 comprises terminals (not shown in the drawings) which are connected with motor contact tabs 68 for voltage supply to the electric motor 54. This electronics unit 64 also serves to fasten the electric motor 54 in the area of the A-bearing 66 and is provided with throttles 70 and capacitors for the suppression of interferences in the electric motor 54. The electronics unit 64 further carries a circuit board 72 on which, besides control elements 74, a contactless position sensor 76 is arranged for position feedback about the output gear 44 and thus about the control body 26 so that an exact control of the waste gate valve 15 is possible. The electronics unit 64 also carries all of the electric lines that lead to a connector 78 formed on the electronics unit 64 and, in the assembled state, extends outward through an opening 80 of the drive housing 50. The electronics unit 64 is fastened to the drive housing 50 by screws 82 and has an opening (not visible in the drawings) through which the drive pinion 58 extends to the rest of the transmission 46 so that the electronics unit 64 is arranged between the transmission 46 and the electric motor 54.

According to the present invention, the drive housing 50 is formed with a coolant inlet port 84 and a coolant outlet port 86. These are connected with a coolant channel 88 that extends in the drive housing 50 substantially over the entire height of the electric motor 54 and surrounds the latter over almost the entire circumference, as shown in particular in FIG. 4. In the circumferential direction, when viewed along a longitudinal axis 55 of the electric motor 54, this coolant channel 88 is interrupted only by two narrow axial partition walls 90, 91 that serve to prevent a short-circuit flow from the coolant inlet port 84 to the coolant outlet port 86 and to convey the coolant axially in the direction of the bearing housing 42.

This section of the coolant channel 88 delimited by the partition walls 90, 91 opens axially into a coolant outlet channel 92 extending axially towards the bearing housing 42, which coolant outlet channel 92, in the assembled state, passes into an axially extending coolant inlet channel 94 formed in the bearing housing 42. The partition walls 90, 91 are provided almost in extension of the walls 93 delimiting the coolant outlet channel 92 in the circumferential direction. A second coolant channel 96 is formed in the bearing housing 42, the second coolant channel 96 surrounding the bearing 40 over its entire circumference, when viewed along a longitudinal axis 41 of the bearing 40, and which is supplied with coolant via the coolant inlet channel 94, which coolant flows in both circumferential directions to a coolant outlet channel 98 formed on the side of the bearing housing 42 opposite the coolant inlet channel 94 and extending in the axial direction. The latter in turn opens into an axially extending coolant outlet channel 100 of the drive housing 50, which in turn opens into the first coolant channel 88, i.e., into the other portion of the coolant channel 88 delimited by the partition walls 90, 91.

Figure 4:
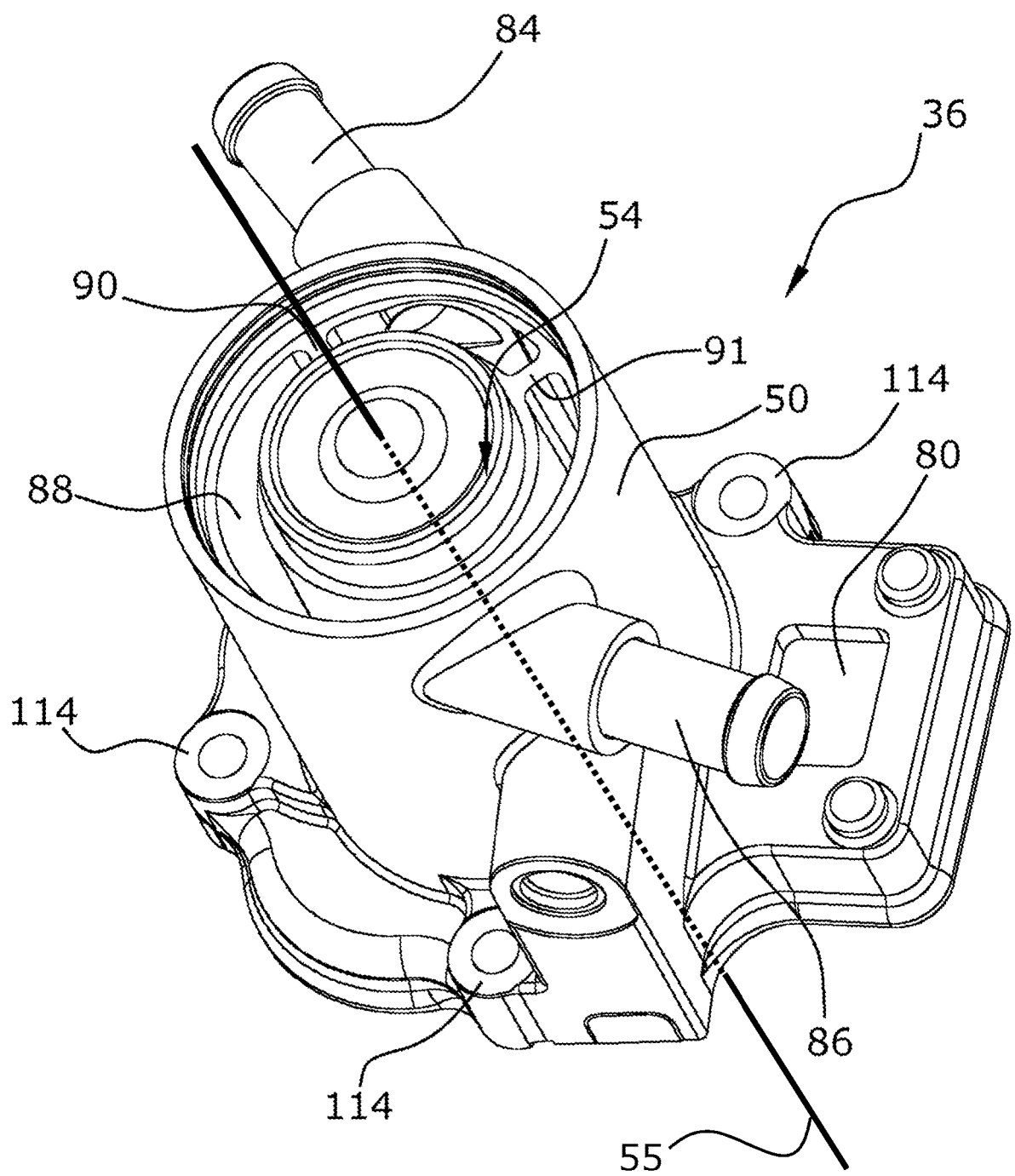
FIG. 4 is a perspective top view of the drive housing of the waste gate valve illustrated in FIG. 2.

The actuator 34 is correspondingly flowed around completely both in the drive housing 50 and in the bearing housing 42. The open axial end of the coolant channel 88, visible in FIG. 4, is closed with a cover 102 which, with interposition of two sealing rings 104, is fixed in its position in a sealing manner at the open end of the coolant channel 88 using a clamping ring 106.

The turbine housing 18 is formed with threaded bores 108 into which screws 110 are screwed that are inserted through screw domes 112 extending over the axial height of the bearing housing 42 and through correspondingly arranged screw domes 114 of the drive housing 50. The bearing housing 42 is fastened to the turbine housing 18 and the drive housing 50 is fastened to the bearing housing 42 when these screws 110 are tightened. For this purpose, the bearing housing 42 and the drive housing 50 are formed with facing, corresponding flange surfaces 116, 118, with grooves 120 being formed in the flange surface 116 of the drive housing 50 for receiving a seal 122 which seal the interior of space 48 of the actuator 34 to the outside and sealingly connect the coolant inlet channels and the coolant outlet channels 92, 94, 98, 100 of the drive housing 50 and of the bearing housing 42.

The described waste gate valve thus has a cooling circuit of its own that makes it possible to control the temperature in the housing of the waste gate valve separately, i.e., independent of the turbine housing of the turbocharger. The actuator of the waste gate valve may be preassembled and thereafter be mounted on the turbine housing so that a direct connection of the actuator to the valve is obtained, whereby a very precise control becomes possible. A long service life is achieved due to the good thermal decoupling of the actuator from the turbine housing and, as a consequence thereof, the low thermal load on the electric motor and on the other electronic components.

It should be clear that the present invention is not restricted to the embodiments described herein. Reference should also be had to the appended claims.

What is claimed is:

1. A turbocharger comprising:
a waste gate valve;
a compressor;
a turbine;
a turbine housing configured to house the turbine;
a bypass channel comprising an opening cross-section, the bypass channel being configured to bypass the turbine;
a bypass channel portion formed in the turbine housing;
an actuator housing comprising a separate first coolant channel which comprises a coolant inlet port and a coolant outlet port, the actuator housing being formed separately and being secured to the turbine housing;
an electric motor arranged in the actuator housing;
a transmission comprising an output shaft, the transmission being arranged in the actuator housing; and
a control body coupled to the output shaft, the control body being configured to control the opening cross-section of the bypass channel,
wherein,
the first coolant channel is configured to radially surround the electric motor when viewed along a longitudinal axis of the electric motor.

2. The turbocharger as recited in claim 1, further comprising:
screws; and
screw domes arranged at the actuator housing, the screw domes being configured so that the actuator housing can be fastened to the turbine housing via the screws.

3. The turbocharger as recited in claim 1, wherein the actuator housing further comprises a two-part design.

4. The turbocharger as recited in claim 3, wherein,
the two-part design of the actuator housing comprises a drive housing and a bearing housing which are connected with each other,
the electric motor is arranged in the drive housing, and
the output shaft is supported in the bearing housing.

5. The turbocharger as recited in claim 4, further comprising:
an electronics unit; and
a space delimited by the drive housing and the bearing housing,
wherein, the transmission and the electronics unit are arranged in the space.

6. The turbocharger as recited in claim 5, wherein the electronics unit comprises a connector and a position sensor.

7. The turbocharger as recited in claim 4, further comprising:
at least one partition wall arranged between the coolant inlet port and the coolant outlet port,
wherein, the first coolant channel is interrupted in a circumferential direction of the electric motor by the at least one partition wall.

8. The turbocharger as recited in claim 7, wherein,
the at least one partition wall comprises two partition walls which extend radially and which, when viewed along the longitudinal axis of the electric motor, are arranged on either side of the coolant inlet port, and
the two partition walls are configured to interrupt the first coolant channel in the circumferential direction.

9. The turbocharger as recited in claim 8, wherein,
the coolant inlet port, the coolant outlet port, the first coolant channel, a first coolant inlet channel, and a first coolant outlet channel are each formed at the drive housing,
a second coolant inlet channel, a second coolant channel, and a second coolant outlet channel are each formed at the bearing housing,
the first coolant outlet channel of the drive housing opens into the second coolant inlet channel of the bearing housing, and
the second coolant outlet channel of the bearing housing opens into the first coolant inlet channel of the drive housing.

10. The turbocharger as recited in claim 9, further comprising a bearing configured to support the output shaft, the bearing being completely radially surrounded by the second coolant outlet channel when viewed along a longitudinal axis of the bearing.

11. The turbocharger as recited in claim 9, further comprising:
walls configured to delimit the first coolant outlet channel of the drive housing,
wherein,
the two partition walls which are configured to interrupt the first coolant channel in the circumferential direction extend over an entire height of the first coolant channel, and
the two partition walls are formed as an extension of the walls.

12. The turbocharger as recited in claim 1, wherein the control body is mounted on the output shaft.

13. The turbocharger as recited in claim 1, further comprising:
a flap shaft having a common axis of rotation with the output shaft,
wherein, the control body is coupled with the flap shaft.

14. The turbocharger as recited in claim 13, wherein the flap shaft is coupled with the output shaft via an Oldham coupling.

* * * * *